United States Patent
Fuge et al.

(10) Patent No.: US 9,324,518 B2
(45) Date of Patent: Apr. 26, 2016

(54) SELF-CONTAINED LINK MODULE FOR GANG-STYLE HIGH VOLTAGE DEAD TANK BREAKER

(71) Applicant: ABB Technology AG, Zurich (CH)

(72) Inventors: Jonathan Fuge, Farmington, PA (US); Beth Dahm, Pittsburgh, PA (US); Matthew Cuppett, Uniontown, PA (US)

(73) Assignee: ABB Technology AG, Zurich (CH)

( * ) Notice: Subject to any disclaimer, the term of this patent is extended or adjusted under 35 U.S.C. 154(b) by 406 days.

(21) Appl. No.: 13/856,450

(22) Filed: Apr. 4, 2013

(65) Prior Publication Data

US 2013/0270089 A1    Oct. 17, 2013

Related U.S. Application Data

(60) Provisional application No. 61/623,600, filed on Apr. 13, 2012.

(51) Int. Cl.
*H01H 33/42*    (2006.01)
*H01H 31/28*    (2006.01)
(Continued)

(52) U.S. Cl.
CPC ............ *H01H 31/283* (2013.01); *H01H 11/00* (2013.01); *H01H 33/022* (2013.01); *H01H 33/42* (2013.01); *H01H 33/52* (2013.01); *H01H 3/46* (2013.01); *H02B 13/035* (2013.01); *Y10T 29/49105* (2015.01)

(58) Field of Classification Search
CPC ..... H01H 33/42; H01H 33/426; H01H 31/04; H01H 31/10; H01H 33/022; H01H 33/58
USPC ............... 200/48 R, 48 CB, 48 A, 337, 50.04
See application file for complete search history.

(56) References Cited

U.S. PATENT DOCUMENTS 2,261,711 A * 11/1941 Behringer .................... 200/81.4
4,996,397 A *  2/1991 Kuhn et al. .................... 218/120
(Continued)

FOREIGN PATENT DOCUMENTS

| DE | 2913379 A1 | 10/1980 |
|---|---|---|
| EP | 0424281 A1 | 4/1991 |
| JP | H0364815 A | 3/1991 |

OTHER PUBLICATIONS

PCT Search Report & Written Opinion in PCT/US2013/035186, dated Jul. 15, 2013.

*Primary Examiner* — Felix O Figueroa
(74) *Attorney, Agent, or Firm* — Manelli Selter PLLC; Edward J. Stemberger

(57) ABSTRACT

A linkage and operating assembly is provided for a dead tank circuit breaker. The circuit breaker has a plurality of pole assemblies and an actuating assembly associated with each pole assembly for opening and closing a movable electrical contact of the associated pole assembly. The linkage and operating assembly includes a linkage module having a plurality of drive structures. Each drive structure has a portion constructed and arranged to be removably coupled to an associated actuating assembly. An operating mechanism is coupled with the linkage module for causing movement of the drive structures substantially simultaneously. When the portions of the drive structures are decoupled from the associated actuating assemblies, the linkage module together with the operating mechanism is constructed and arranged to be removed as a single unit from the circuit breaker.

8 Claims, 3 Drawing Sheets

(51) Int. Cl.
*H01H 33/52* (2006.01)
*H01H 11/00* (2006.01)
*H01H 33/02* (2006.01)
*H01H 3/46* (2006.01)
*H02B 13/035* (2006.01)

(56) References Cited

U.S. PATENT DOCUMENTS 5,576,523 A * 11/1996 Meyer .................... 200/17 R
8,338,727 B2 * 12/2012 Wolfe .................... 200/17 R

* cited by examiner

SELF-CONTAINED LINK MODULE FOR GANG-STYLE HIGH VOLTAGE DEAD TANK BREAKER

FIELD

The invention relates to high voltage dead tank circuit breakers and, more particularly, to a drive train linkage module associated with an operating mechanism of the circuit breaker so that the linkage module and operating mechanism can be removed from the circuit breaker as a single unit.

BACKGROUND

Circuit breakers are commonly found in substations and are operable to selectively open and close electrical connections. Typical dead tank circuit breakers have pole assemblies that include first and second electrical conductors in associated bushings. As is known in the art, electrical power lines are coupled to first and second electrical conductors, and the circuit breaker selectively opens or closes the electrical connection there-between. A bell crank or other actuating assembly is associated with a respective pole assembly. The bell cranks are interconnected by a gang-style rotary or push-pull linkage so that all three poles assemblies are actuated at the same time by a single operating mechanism. However, since the linkage is part of the full breaker assembly, it has to be installed and removed on a component by component basis.

Serviceability depends on disassembly and reassembly time. Currently, all three pole operated breakers have a long disassembly time because the linkage structure is on a component basis.

There is a need to provide a linkage module for a dead tank circuit breaker that can be installed and removed together with the operating mechanism as a unit to avoid individually assembling or disassembling a linkage at each individual pole.

SUMMARY

An object of the invention is to fulfill the need referred to above. In accordance with the principles of the present invention, this objective is obtained by providing a linkage and operating assembly for a dead tank circuit breaker. The circuit breaker has a plurality of pole assemblies and an actuating assembly associated with each pole assembly for opening and closing a movable electrical contact of the associated pole assembly. The linkage and operating assembly includes a linkage module having a plurality of drive structures. Each drive structure has a portion constructed and arranged to be removably coupled to an associated actuating assembly. An operating mechanism is coupled with the linkage module for causing movement of the drive structures substantially simultaneously. When the portions of the drive structures are decoupled from the associated actuating assemblies, the linkage module together with the operating mechanism is constructed and arranged to be removed as a single unit from the circuit breaker.

In accordance with another aspect of the disclosed embodiment, a method of decoupling a linkage and operating assembly from a dead tank circuit breaker is provided. The circuit breaker has a plurality of pole assemblies and an actuating assembly associated with each pole assembly for opening and closing a movable electrical contact of the associated pole assembly. The method provides a linkage module having a plurality of drive structures. Each drive structure is coupled to an associated actuating assembly. An operating mechanism is coupled with the linkage module for causing movement of the drive structures substantially simultaneously. The method decouples the portions of the drive structures from the associated actuating assemblies. The linkage module together with the operating mechanism is then removed as a single unit from the circuit breaker without disrupting factory settings of the circuit breaker.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
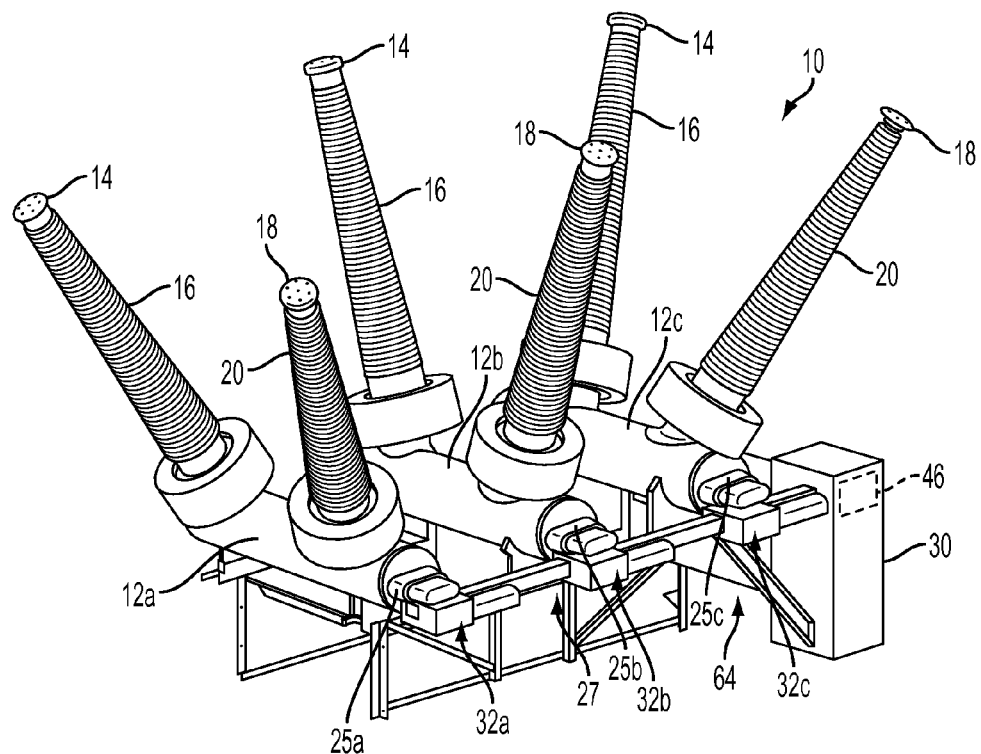
FIG. 1 is a front view of a high voltage, three pole operated dead tank circuit breaker having an interphase linkage module in accordance with an embodiment.

With reference to FIG. 1, a circuit breaker is shown, generally indicated at 10. Circuit breaker 10 is preferably a three phase circuit breaker and thus includes three pole assemblies 12a, 12b and 12c. Each pole assembly 12 includes a first electrical conductor 14 carried in a first bushing 16 and a second electrical conductor 18 carried in a second bushing 20. Electrical power lines are coupled to the first and second electrical conductors 14 and 18, and the circuit breaker 10 selectively opens or closes the electrical connection there-between.

Figure 2:
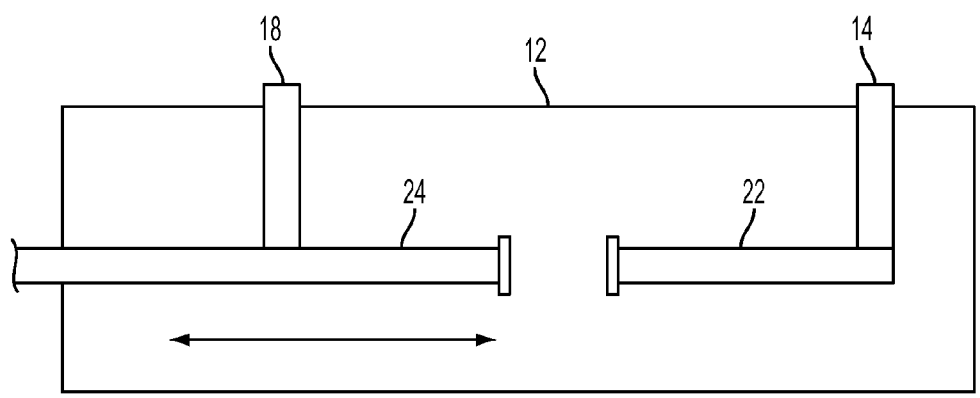
FIG. 2 is a schematic view of an interior of a breaker pole of the circuit breaker of FIG. 1, wherein the electrical contacts are open.

With reference to FIG. 2, a simplified view of an interior of pole assembly 12 is shown, wherein first electrical conductor 14 is electrically connected to a stationary contact 22 which is immovably secured within pole assembly 12. Second electrical conductor 18 is electrically connected to a movable contact 24 which is carried within pole assembly 12 in a manner allowing longitudinal movement therein. Thus, in a first position, the movable contact 24 may be positioned to break the electrical connection between first the electrical conductor 14 and second electrical conductor 18 (FIG. 2). In a second position, the movable contact 24 may be brought into contact with stationary contact 22 to electrically connect the first electrical conductor 14 and the second electrical conductor 18. The interior space of pole assemblies 12 are sealed and generally adapted to minimize arcing between stationary contact 22 and movable contact 24. The interior volume of pole assembly 12 may be filled with dielectric material that preferably includes SF6, dry air, dry nitrogen, $CO_2$ or oil. Alternatively, a vacuum-type interrupter could be employed within the tank volume surrounded by dielectric materials mentioned.

Figure 3:
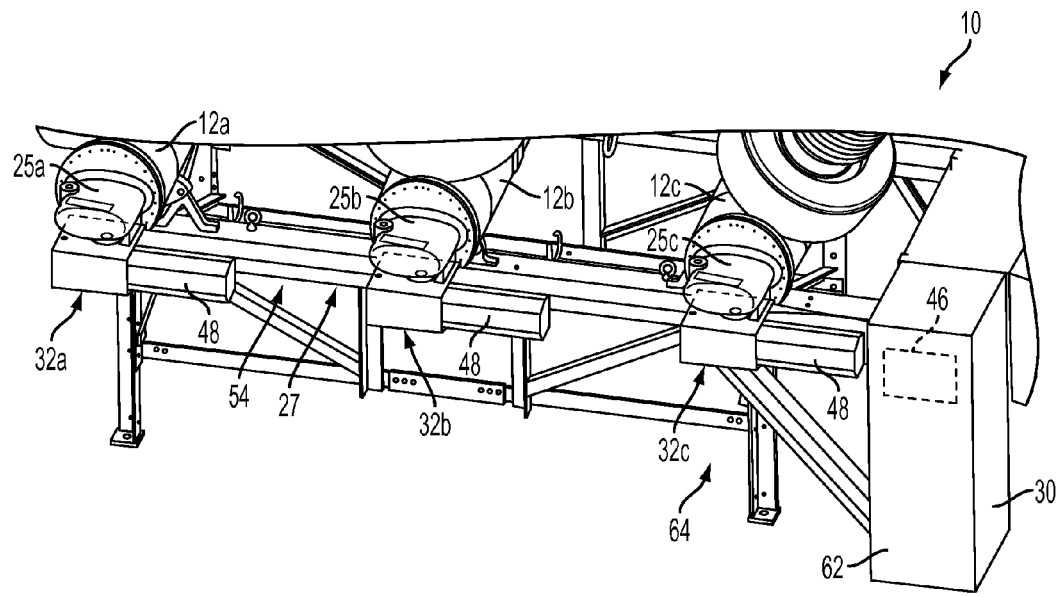
FIG. 3 is an enlarged view of the linkage module of FIG. 1 coupled to bell crank assemblies and an operating mechanism.

With reference to FIG. 3, an actuating assembly, preferably in the form of a bell crank assembly 25a, 25b, 25c, is coupled with the movable electrical contact 24 of a respective pole assembly 12a, 12b and 12c for opening and closing the electrical connection between conductors 14 and 18. The bell crank assemblies are conventional and can be of the type disclosed in U.S. Patent Application Publication No. 20100270136A1, the content of which is hereby incorporated by reference into this specification. The bell crank assemblies are preferably interconnected by a gang-style, pull-pull linkage module, generally indicated at 27, so that all three poles assemblies are actuated at the same time by a conventional, electrically controlled operating mechanism 30.

Figure 4:
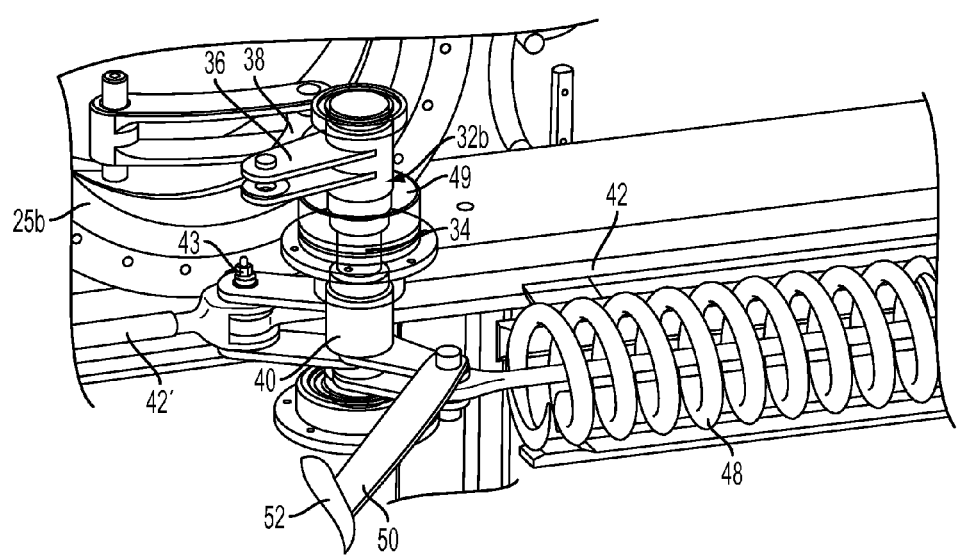
FIG. 4 is a view of a lever assembly of the linkage module of FIG. 3, coupled to a bell crank assembly and shown with housings removed.

With reference to FIGS. 3 and 4, the linkage module 27 includes a drive structure, generally indicated at 32a, 32b and 32c, coupled with a respective bell crank assembly 25a, 25b and 25c for opening and closing the electrical connection at the associated pole assembly 12a, 12b and 12c. In particular and as best shown in FIG. 4, each drive structure (32b shown) includes a drive shaft 34 and a drive lever 36 coupled to an end of the drive shaft 34 for rotation with the drive shaft 34. The drive shaft 34 preferably includes splines or is keyed for removable connection with the drive lever 36. The drive lever 36 is coupled via a crank link 38 with the associated bell crank assembly (e.g., bell crank assembly 25b in FIG. 4). A linkage lever 40 is coupled to the other end of the drive shaft 34 for rotation with the drive shaft 34. Linkage lever 40 is coupled to interphase connection rods 42, 42' of the linkage module 27 via pin 43 so that linear motion of the connection rods causes rotation of the linkage lever 40 and thus the drive shaft 34. Rod 42 is connected to a linkage lever 40 associated with bell crank assembly 25c and rod 42' is connected to a linkage lever 40 associated with bell crank assembly 25a. Thus, for three pole circuit breaker, three drive structures 32a, 32b and 32c are provided, interconnected by first and second connection rods 42, 42'. A third connection rod 44 (FIG. 5) is coupled to the drive structure 32c associated with crank assembly 25c and to a close spring 46 in the operating mechanism 30 for closing the circuit breaker 10 in the known manner. Since the drive structures 32 are interconnected via the connection rods 42, 42' and rod 44, the drive structures move simultaneously upon actuating of the mechanism 30 to operate the bell crank assemblies simultaneously.

As shown in FIGS. 3 and 4, at least one open spring 48 is coupled to a drive structure 32 to provide the force opposing the close spring 46 for opening the electrical conductors 14, 18 of the circuit breaker 10. In the embodiment, three open springs 48 are provided, one for each pole assembly 12 with the total spring force of the open springs 48 opposing the spring force of the close spring 46. However, instead of providing three separate open springs 48, a single open spring 48 can be provided, for example, at only pole assembly 12a that opposes the force of the close spring 46.

Each drive shaft 34 is neither rigidly connected to the associated bell-crank assembly (e.g., 25b) nor to the linkage module 27. The drive shaft 34 is held in place in an internal bore of the associated linkage lever 40 by retaining structure such as, for example, a snap ring or any other quick release device. When the retaining structures are removed or disassociated, the drive shafts 34 can be completely removed from the drive levers 36, decoupling the linkage module 27 from the bell crank assemblies 25a, 25b and 25c. A bearing structure 49 with appropriate seals is provided between the associated bell crank assembly and the drive lever 36 so as to prevent disruption of the dielectric material in the bell crank assembly while the drive shaft 34 is removed from the drive lever 36. Such structure is disclosed in co-pending U.S. provisional patent application entitled, "Floating Drive Shaft Between An Actuating Assembly And Linkage Structure Of A Dead Tank Breaker", Ser. No. 61/623599, the content of which is hereby incorporated by reference into this specification.

To maintain factory spring settings of the open springs 48 when the associated drive shaft 34 is removed, adjustable spring retaining structure 50 can be coupled to an associated link lever 40 and to a housing 52. The spring retaining structure 50 may be of the type disclosed in co-pending U.S. provisional patent application entitled, "Retaining Structure For Maintaining Factory Settings Of Gang-Style Linkage For High Voltage Dead Tank Breaker While Mechanism Is Removed", Ser, No. 61/623601, the content of which is hereby incorporated by reference into this specification.

Figure 5:
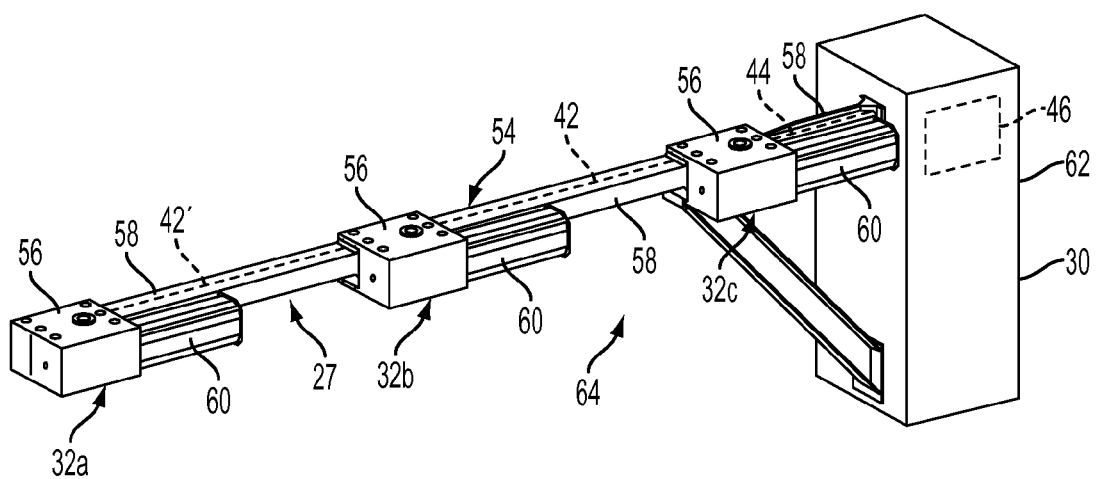
FIG. 5 is a view of the linkage and operating assembly FIG. 3, shown removed as a unit from a circuit breaker.

As shown in FIGS. 3 and 5, the drive structure 32a, 32b and 32c, the open springs 48, and the connection rods 42, 42', 44 of the linkage module 27 are provided in housing structure, generally indicated at 54. In particular, each drive structure 32 is provided in a transmission box 56, each rod, 42, 42, 44 is provided in a rod housing 58, and each spring 48 is provided a spring housing 60 of the housing structure 54. The housing structure 54 is coupled to housing 62 of the operating mechanism 30 to define a linkage and operating assembly, generally indicated at 64 (FIG. 5). Thus, once the drive shafts 34 are removed as described above, the assembly 64 can be removed as a single unit from the remainder of the circuit breaker 10 without disrupting factory settings of the circuit breaker.

Thus, service time of the circuit breaker 10 can be reduced since the assembly 64 can be removed as a whole and reassembled as a whole without major (or any) changes to the factory settings of the circuit breaker 10. Furthermore, a pole may be removed for servicing without disassembly of the linkage, which is typical in conventional circuit breakers.

Although a pull-pull linkage module 27 is disclosed, the linkage module can be of the conventional push-pull or a conventional rotary system that provides mechanical decoupling between the bell crank assemblies and the linkage module.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A dead tank circuit breaker assembly comprising:
   a plurality of pole assemblies and an actuating assembly associated with each pole assembly and filled with dielectric material for opening and closing a movable electrical contact of the associated pole assembly, and
   a linkage and operating assembly comprising:
      a linkage module having a plurality of drive structures, each drive structure having a portion constructed and arranged to be removably coupled to an associated actuating assembly,
      a bearing structure sealing disposed between each drive structure and associated actuating assembly, and
      an operating mechanism coupled with the linkage module for causing movement of the drive structures substantially simultaneously, wherein, when the portions of the drive structures are decoupled from the associated actuating assemblies, the linkage module together with the operating mechanism is constructed and arranged to be removed as a single unit from the circuit breaker, without removing the actuating assemblies from the circuit breaker and with the bearing structure preventing disruption of the dielectric material therein.

2. The assembly of claim 1, wherein three drive structures are provided, each drive structure comprising:
   a drive lever constructed and arranged to be coupled with an associated actuating assembly at each of the pole assemblies,
   a drive shaft removably coupled to the drive lever so as to define the portion that is decoupled from the actuating assemblies, and
   a linkage lever coupled to the drive shaft.

3. The assembly of claim 2, wherein the operating mechanism includes a close spring and the linkage module further comprises:
   first and second connecting rods coupled between the three linkage levers,
   a third connection rod coupled between one of the linkage levers and the close spring, and
   at least one open spring providing a spring force on the linkage module opposing a force of the close spring.

4. The assembly of claim 3, wherein the linkage module includes housing structure coupled to a housing containing the operating mechanism.

5. The assembly of claim 4, wherein the housing structure includes a transmission box containing an associated drive stricture, a spring housing containing the at least one open spring, and a rod housing containing an associated connection rod.

6. The assembly of claim 3, wherein the linkage module further comprises spring retaining structure constructed and arranged to maintain a factory spring force on the at least one open spring when the drive shafts are removed from the drive levers.

7. The assembly of claim 2, wherein the bearing structure is sealing disposed between each actuating assembly and associated drive lever so as to seal the dielectric material in the actuating assembly when the drive shaft is removed.

8. The assembly of claim 2, wherein the actuating assemblies are bell crank assemblies and each drive lever is coupled to an associated bell crank assembly by a crank link.

* * * * *